US012754012B2

(12) United States Patent
Lin

(10) Patent No.: US 12,754,012 B2
(45) Date of Patent: Oct. 6, 2026

(54) OPTICAL COMMUNICATION DEVICE AND OPERATION METHOD THEREOF

(71) Applicant: Nanning FuLian FuGui Precision Industrial Co., Ltd., Nanning (CN)

(72) Inventor: Yu-Xuan Lin, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 85 days.

(21) Appl. No.: 18/937,385

(22) Filed: Nov. 5, 2024

(65) Prior Publication Data

US 2026/0126285 A1 May 7, 2026

(51) Int. Cl.
*G01B 11/16* (2006.01)

(52) U.S. Cl.
CPC ............ *G01B 11/18* (2013.01); *G01B 11/161* (2013.01)

(58) Field of Classification Search
CPC ........ G01B 7/16; G01B 11/161; G01B 11/18; G01L 1/04; G01L 1/048; G01L 1/06
See application file for complete search history.

(56) References Cited

U.S. PATENT DOCUMENTS 5,822,876 A * 10/1998 Haas .................... G01L 5/0047
33/DIG. 13
2008/0166099 A1 7/2008 Dunphy et al.

FOREIGN PATENT DOCUMENTS

| | | | | |
|---|---|---|---|---|
| CN | 103616041 B | * | 12/2014 | |
| CN | 106772832 A | | 5/2017 | |
| CN | 211320410 U | * | 8/2020 | |
| CN | 113932953 A | * | 1/2022 | ............... G01L 1/16 |
| FR | 3066814 A1 | * | 11/2018 | ........... G01L 1/2293 |
| JP | 2004037802 A | * | 2/2004 | |
| TW | 524315 U | | 3/2003 | |
| TW | I717991 B | | 2/2021 | |

* cited by examiner

*Primary Examiner* — Michael A Lyons
(74) *Attorney, Agent, or Firm* — ScienBiziP, P.C.

(57) ABSTRACT

An optical communication device and the operation method thereof are provided. The optical communication device includes a housing, a positioning structure, and a deformation sensor. The housing includes a front opening and an inner elastic sheet adjacent to the front opening. The positioning structure is disposed on the housing, and includes an outer elastic sheet adjacent to the inner elastic sheet. The deformation sensor is between the inner elastic sheet and the outer elastic sheet. When the optical communication module is inserted into the housing and deforms the inner elastic sheet, the deformation sensor transmits deformation signals.

18 Claims, 8 Drawing Sheets

OPTICAL COMMUNICATION DEVICE AND OPERATION METHOD THEREOF

FIELD

The subject matter herein generally relates to optical communication devices and the operation method thereof.

BACKGROUND

An optical communication network has the characteristics of low transmission loss, high data confidentiality, excellent anti-interference, and ultra-large bandwidth, and has become the main information communication method. In general, pluggable optical communication modules are mounted in an optical communication device. The optical communication modules receive optical signals from the optical network and convert the optical signals into electric signals for transmission, and/or convert the electric signals into optical signals and then transmit the optical signals out through optical fibers.

In addition, cages are used to hold the optical communication modules to maintain the connection between the optical communication module and the electrical connector in the optical communication device, so as to prevent the signal transmission between the optical communication module and the electrical connector from being interrupted. When the optical communication module is inserted into the cage, an elastic sheet of the cage fastens the optical communication module to keep the position of the optical communication module in the cage. However, the optical communication module may collide with the elastic sheet and cause damages to the elastic sheet due to improper operation.

Since the elastic sheet is within the cage, it may be difficult for users to notice that the elastic sheet has been damaged. In the process of replacing the optical communication module, the new optical communication module may be incorrectly connected to the electrical connector, causing poor transmissions between the optical communication module and the electrical connector.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
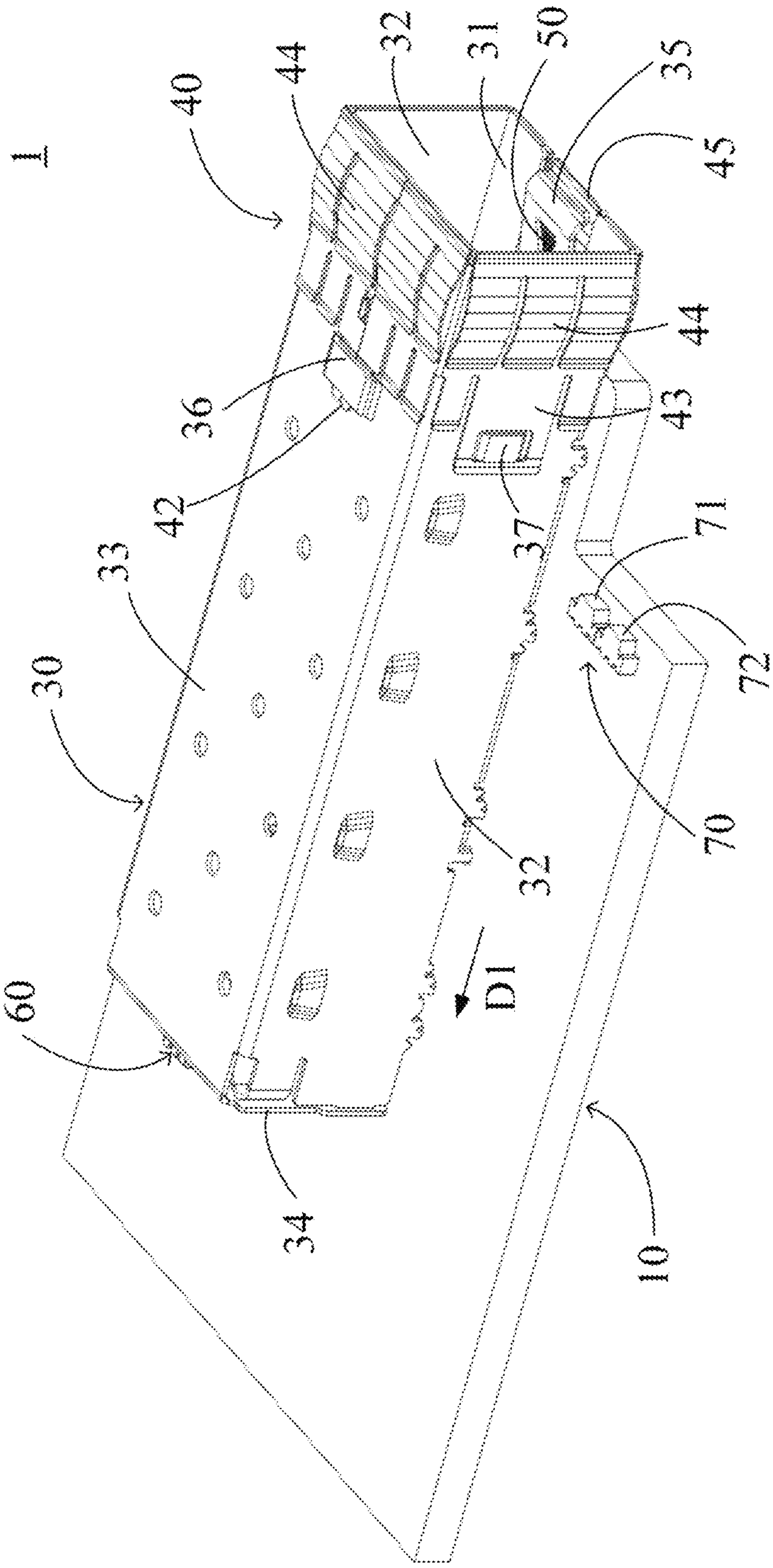
FIG. 1 is a perspective view of an optical communication device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connect" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

In the present disclosure, an optical communication device utilizes a deformation sensor to detect whether the inner elastic sheet is deformed. In addition, the distance sensor measures the position of the optical communication module in the housing, which can then prompt the user whether the optical communication module is well connected to the electrical connector.

Figure 2:
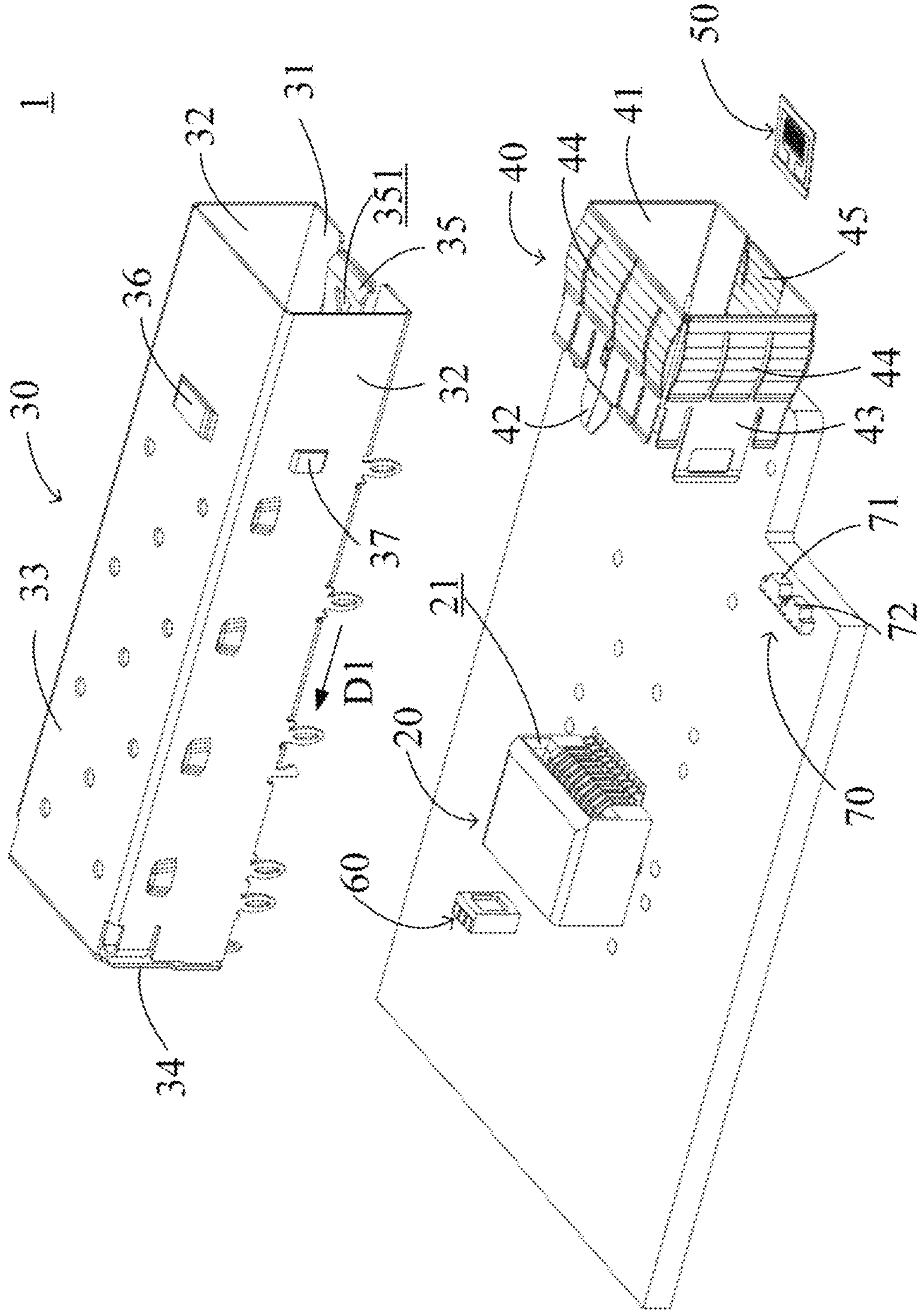
FIG. 2 is an exploded view of the optical communication device shown in FIG. 1.
Figure 3:
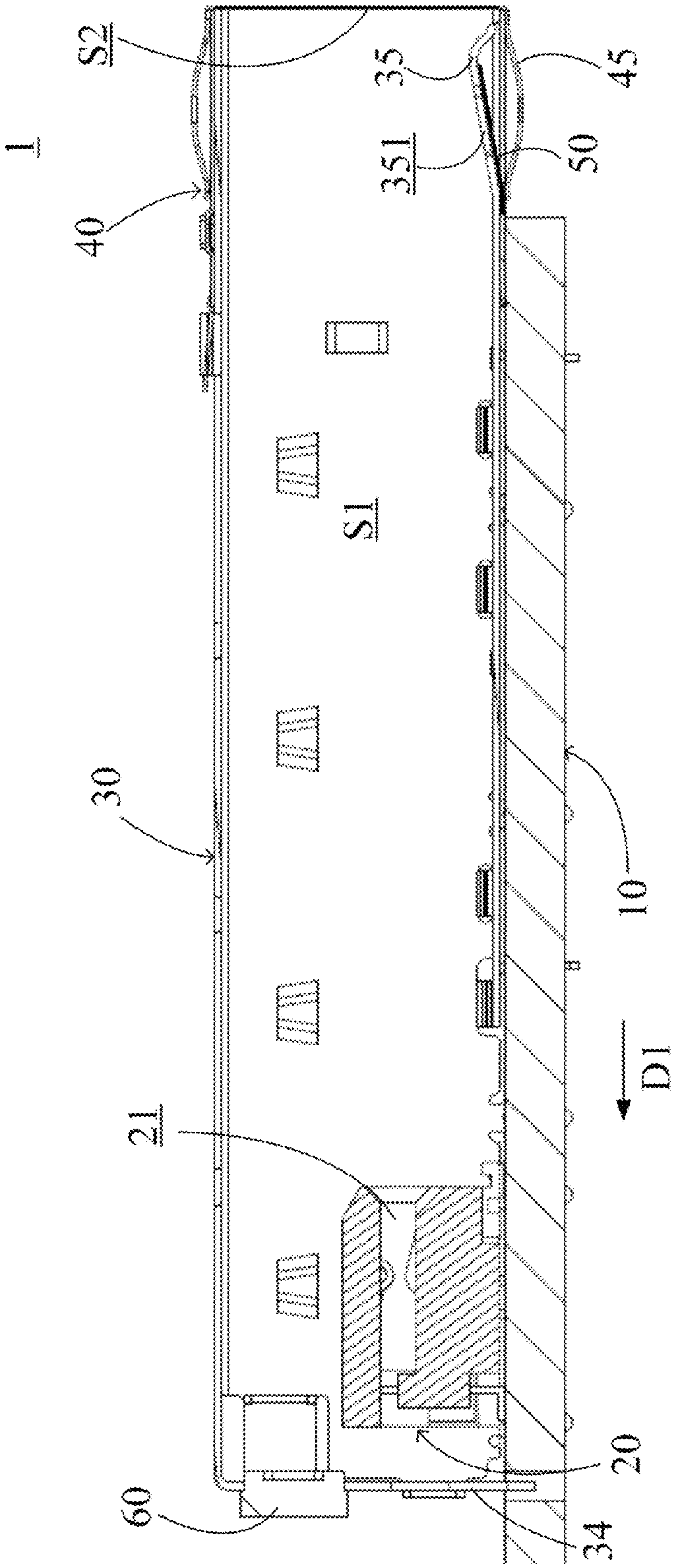
FIG. 3 is a cross-sectional view of the optical communication device shown FIG. 1.
Figure 4:
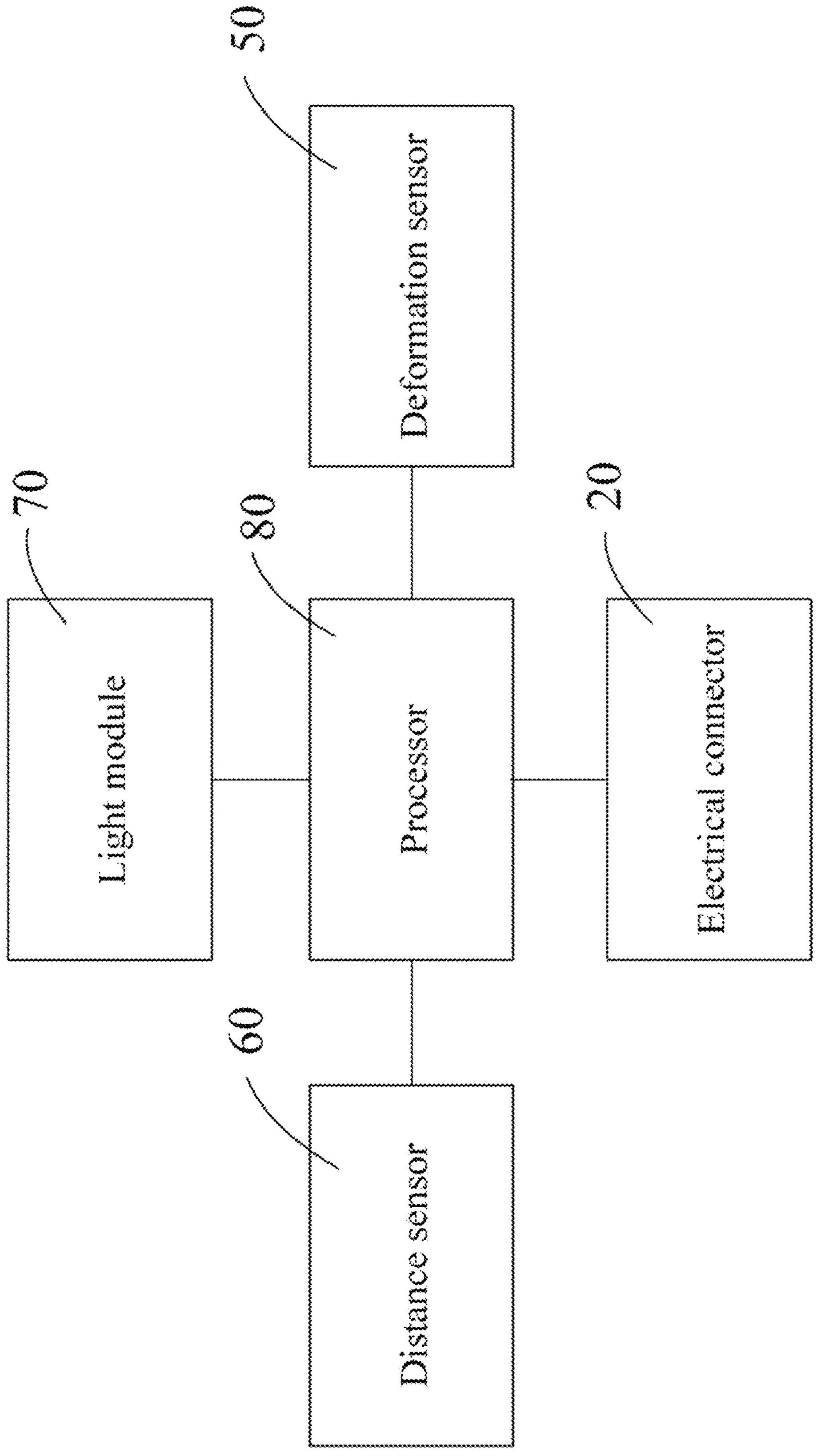
FIG. 4 is a system diagram of the optical communication device 1.
Figure 6:
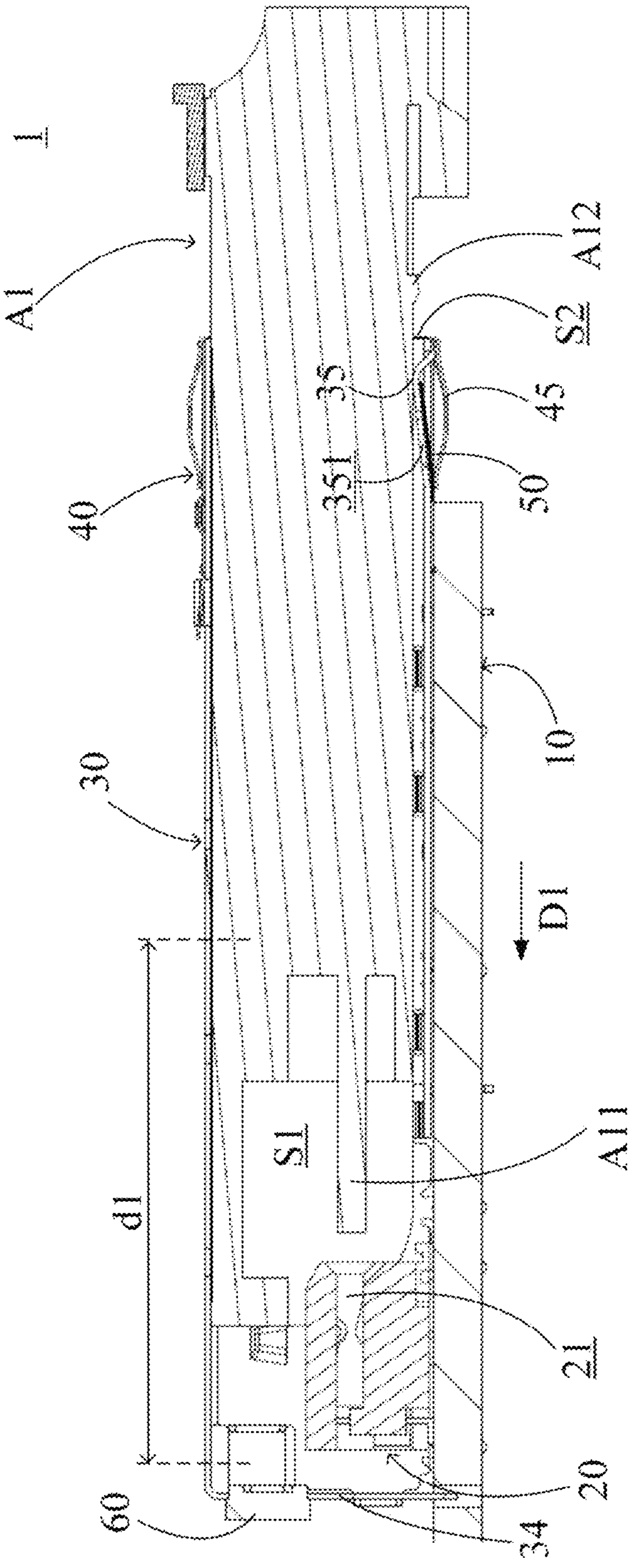
FIG. 6, FIG. 7 and FIG. 8 are operation diagrams of the optical communication device corresponding to the operation method illustrated in FIG. 5.

FIG. 1 is a perspective view of an optical communication device 1 in accordance with an embodiment of the present disclosure. FIG. 2 is an exploded view of the optical communication device 1 shown in FIG. 1. FIG. 3 is a cross-sectional view of the optical communication device 1 shown FIG. 1. FIG. 4 is a system diagram of the optical communication device 1. The optical communication device 1 may be a computer, a server, a router, or a switch. The optical communication module A1 shown in FIG. 6 is connected to an optical fiber, and detachably mounted in the optical communication device 1. For example, the optical communication module A1 may be a small form-factor pluggable transceiver, SFP.

The optical communication device 1 includes a circuit board 10, an electrical connector 20, a housing 30, a positioning structure 40, a deformation sensor 50, a distance sensor 60, a light module 70, and a processor 80. The electrical connector 20 is disposed on the circuit board 10, and electrically connected to the circuit board 10. The optical communication module A1 shown in FIG. 6 is used to be inserted into the electrical connector 20. The optical communication module A1 is connected to the optical fiber, receives optical signals from the optical fiber, and transforms the optical signals to electric signals. The optical communication module A1 can transmit electric signals from the electrical connector 20 to the circuit board 10. Moreover, the optical communication module A1 can receive electric signals from the electrical connector 20, transform the electric signals to optical signals, and transmit the optical signals to the optical fiber.

The housing 30 is disposed on the circuit board 10, and the housing 30 can be a cage. The housing 30 covers the electrical connector 20. In other words, the electrical connector 20 is disposed in the housing 30. The optical communication module A1 is used to be inserted into the housing 30 to connect to the electrical connector 20. In the embodiment, the housing 30 may be an elongated structure, and extends in the insertion direction D1. The housing 30 includes a bottom plate 31, two side walls 32, a top plate 33, a rear wall 34 and an inner elastic sheet 35. The bottom plate 31, the side walls 32, the top plate 33, the rear wall 34 and the inner elastic sheet 35 can be made by single metal plate, and can be made by stamping and bending processes.

The bottom plate 31, the side walls 32 and the top plate 33 can be elongated shapes, and extend in the insertion direction D1. The bottom plate 31 is adjacent to or contacts the circuit board 10. The side walls 32 is connected to the bottom plate 31, and extend perpendicular to the bottom plate 31 and the top plate 33. The side walls 32 may be parallel to or separated from each other. The top plate 33 is connected to the side walls 32, extends parallel to the bottom plate 31, and separated from the bottom plate 31. The rear wall 34 is connected to the bottom plate 31, the top plate 33 and the side walls 32, and located at the rear side of the housing 30.

A receiving chamber S1 is formed by the bottom plate 31, the side walls 32, the top plate 33, and the rear wall 34 form. A front opening S2 is formed by the front edges of the bottom plate 31, the side walls 32 and the top plate 33. The front opening S2 is located at the front side of the housing 30, and is connected to the receiving chamber S1. Moreover, the front opening S2 is opposite to the rear wall 34, and separated from the rear wall 34. The optical communication module A1 can be inserted into the receiving chamber S1 of the housing 30 in the insertion direction D1 via the front opening S2. The inner elastic sheet 35 is connected to the bottom plate 31, and adjacent to the front opening S2. In the embodiment, the bottom plate 31 includes an inner notch, connected to the front opening S2 and the receiving chamber S1. The inner elastic sheet 35 may be in the inner notch, and connected to one edge of the inner notch. Moreover, the top of the inner elastic sheet 35 is in the receiving chamber S1, and the inner elastic sheet 35 extends toward the front opening S2.

The positioning structure 40 is disposed on the housing 30, and is located at the front side of the housing 30. The positioning structure 40 includes a frame 41, a combination sheet 42, connection sheets 43, positioning elastic sheets 44□ and an outer elastic sheet 45. The frame 41, the combination sheet 42, the connection sheets 43, positioning elastic sheets 44, and the outer elastic sheet 45 may be integrally formed and made of the same materials, such as metal.

The frame 41 covers the front edges of the bottom plate 31, the side walls 32, and the top plate 33 of the housing 30. The frame 41 is adjacent to the front opening S2. The combination sheet 42 is connected to the frame 41, and extends in the insertion direction D1. The housing 30 further includes a combination structure 36, disposed on the top plate 33. The combination sheet 42 is inserted into the combination structure 36 of the housing 30, thereby affixing the positioning structure 40 to the housing 30. Moreover, the housing 30 further includes two connection bumps 37 disposed on the side walls 32. The connection sheets 43 are connected to the frame 41, and extend in the insertion direction D1. The connection bumps 37 extend through the connection sheets 43, thereby affixing the positioning structure 40 to the housing 30.

The positioning elastic sheets 44 are disposed on the frame 41. In the embodiment, the positioning elastic sheets 44 are arranged around the frame 41. Each of the free ends of the positioning elastic sheets 44 contacts or adjacent to the frame 41, and each of the central segments of the positioning elastic sheets 44 is separated from the frame 41. The positioning elastic sheets 44 are used to affixed the housing 30 to the casing (not shown in figures) of the optical communication device 1. The outer elastic sheet 45 is adjacent to the inner elastic sheet 35. In the embodiment, the frame 41 includes an outer notch, adjacent to the front opening S2 and the inner notch of the housing 30. The outer elastic sheet 45 is connected to one edge of the outer notch, and the free end of the outer elastic sheet 45 may be in the outer notch. The outer elastic sheet 45 extends toward the front opening S2. When the optical communication module A1 is inserted into the housing 30 and deforms the inner elastic sheet 35, the outer elastic sheet 45 can apply elastic force to the inner elastic sheet 35 and elastically resist against, thereby preventing the inner elastic sheet 35 from being damaged due to the impact of the optical communication module A1.

The deformation sensor 50 is disposed between the inner elastic sheet 35 and the outer elastic sheet 45, and electrically connected to the circuit board 10. In the embodiment, the deformation sensor 50 can be a strain gauge. The deformation sensor 50 is used to detect whether the inner elastic sheet 35 is deformed. When the inner elastic sheet 35 is deformed, the deformation sensor 50 transmits deformation signals to the circuit board 10.

The distance sensor 60 is disposed in the housing 30, and can be over the electrical connector 20. The distance sensor 60 can be mounted on the rear wall 34 or the top plate 33. In the embodiment, the distance sensor 60 extends through the rear wall 34. The distance sensor 60 is used to measure the distance between the optical communication module A1 and the distance sensor 60. In the embodiment, the distance sensor 60 may be an infrared rangefinder. The distance sensor 60 is used to measure the distance between the optical communication module A1 and the distance sensor 60 in the insertion direction D1. The distance sensor 60 is electrically connected to the circuit board 10, and transmits distance signals or connection signals to the circuit board 10 according the distance between the optical communication module A1 and the distance sensor 60.

The light module 70 emits warning light in response the deformation signals, and emits notification light or connection light in response the distance signals. In the embodiment, the light module 70 is disposed on the circuit board 10, and is electrically connected to the circuit board 10. The light module 70 includes light elements, electrically connected to the circuit board 10. For example, the light elements may be light emitting diodes, LEDs. The light module 70 includes a first light element 71 and a second light element 72. The first light element 71 emits blue light, and the second light element 72 emits red light. The light module 70 emits the notification light and/or the connection light by enabling the first light element 71 and/or the second light element 72.

As shown in FIG. 1 to FIG. 4, the processor 80 in FIG. 4 is electrically connected to the electrical connector 20, the deformation sensor 50, the distance sensor 60, and light module 70. The processor 80 may be a chip, disposed on the circuit board 10, and is electrically connected to the circuit board 10. The processor 80 is used to receive and process the electric signals from the electrical connector 20, and transmits electric signals to the electrical connector 20. The processor 80 receives the deformation signals, and transmits control signals to the light module 70 according the deformation signals. The light module 70 enables the second light element 72 to emit the warning light according to the control signals. For example, the warning light may be red light.

Moreover, the processor 80 can receive the distance signals or the connection signals, and transmit control signals to the light module 70 according to the distance signals or the connection signals. The light module 70 enables the first light element 71 to emit the notification light or the connection light according to the control signals. For example, the notification light may be flashing blue light, and the connection light may be continuous blue light.

Figure 5:
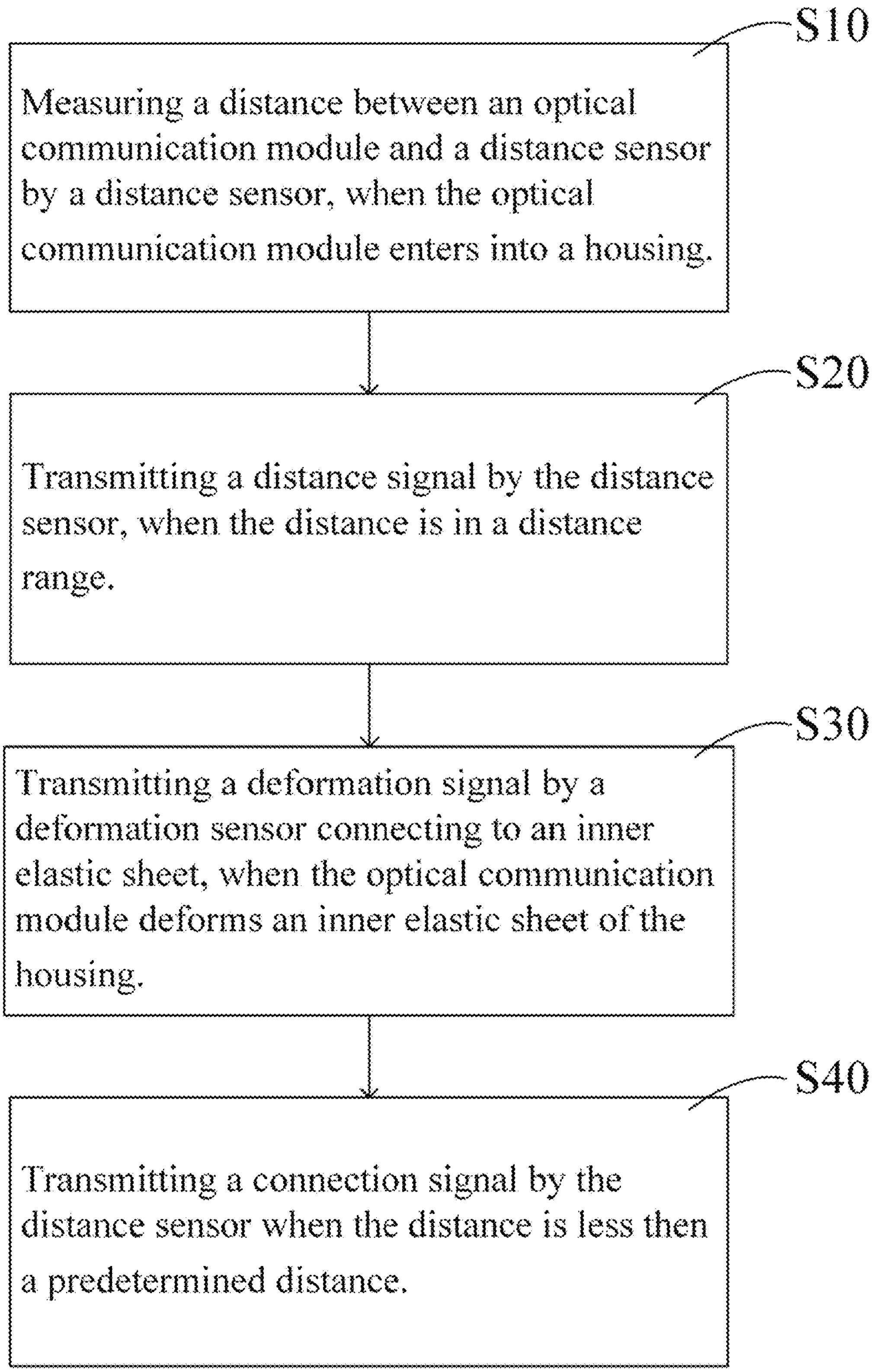
FIG. 5 is an embodiment of a flowchart of an operation method according to the present disclosure, the operation method being applied by the optical communication device.
Figure 7:
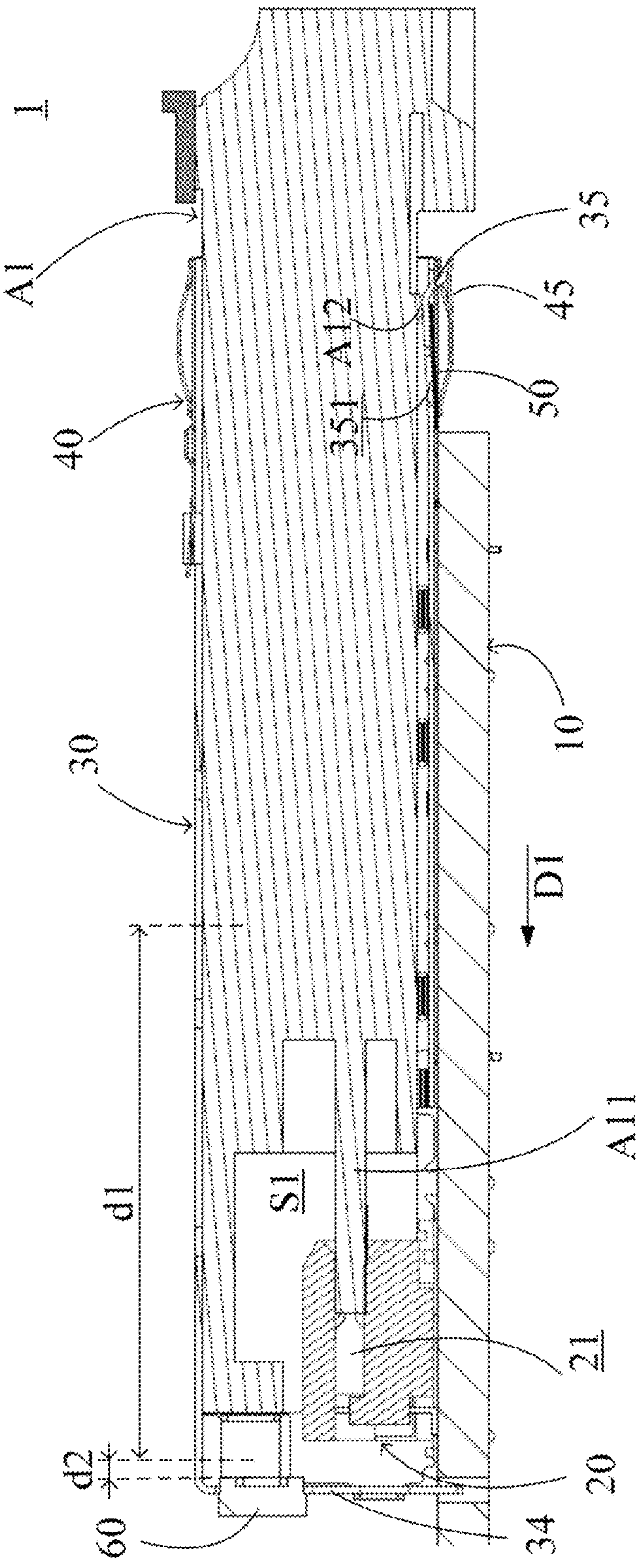
Figure 8:
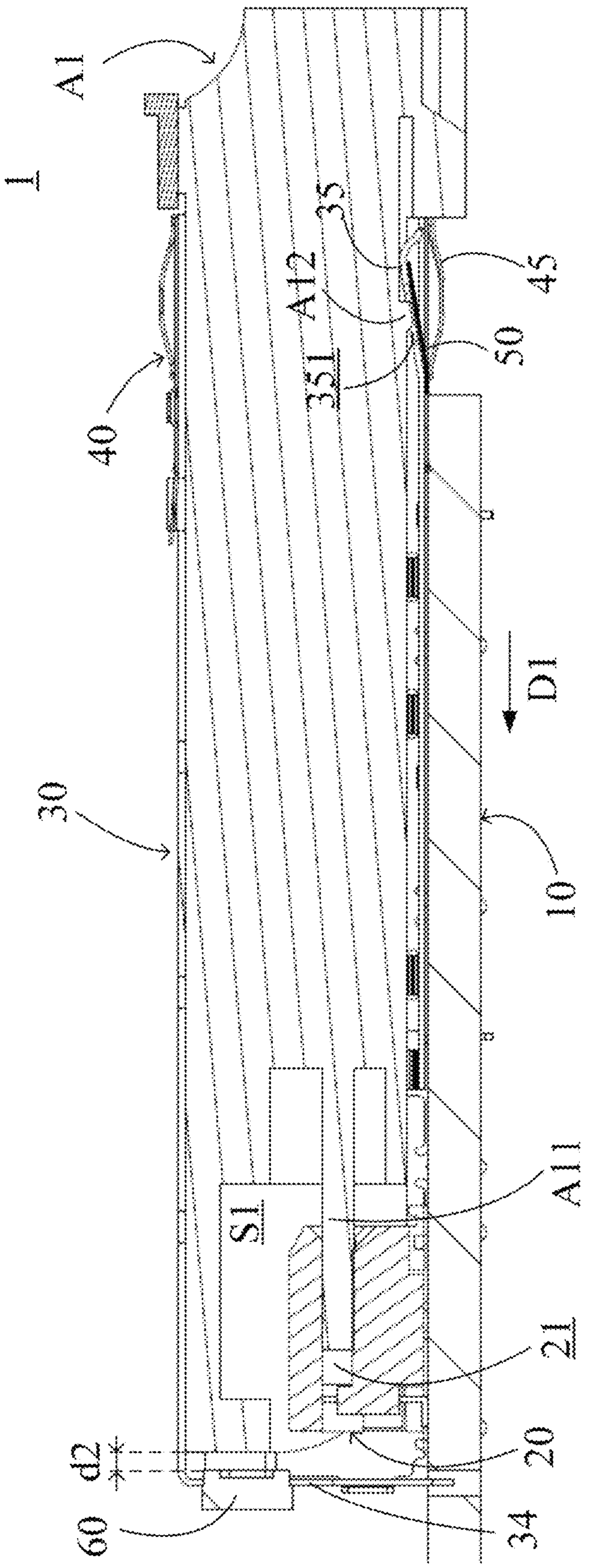

FIG. 5 is a flowchart of the operation method of the optical communication device 1. FIG. 6 to FIG. 8 are operation diagrams of the optical communication device 1 during the operation method. In the step S10, the optical communication module A1 inserted into the housing 30 in the insertion direction D1 via the front opening S2. The distance sensor 60 measures the distance between the optical communication module A1 and the distance sensor 60. As shown in FIG. 6, the distance between the optical communication module A1 and the distance sensor 60 is within a distance range d1. In the embodiment, the distance range d1 is in a range from 0.02 times to 0.5 times the length of housing 30. The length of the housing 30 and the distance range d1 are measured in the insertion direction D1.

For example, the distance range d1 may be in a range from 1 mm to 25 mm. In the FIG. 6 the distance between the optical communication module A1 and the distance sensor 60 can be 8 mm, and the distance is within the distance range d1. At this time, the optical communication module A1 does not contact the electrical connector 20, and the terminal portion A11 of the optical communication module A1 is separated from the electrical connector 20. Moreover, the optical communication module A1 does not press the inner elastic sheet 35, and the buckle A12 of the optical communication module A1 is separated from the inner elastic sheet 35. In other words, the inner elastic sheet 35, the outer elastic sheet 45 and deformation sensor 50 does not being deformed, and are at initial positions.

In the step S20, as shown in FIG. 6, when the distance sensor 60 detects the distance between the optical communication module A1 and the distance sensor 60 within the distance range d1, the distance sensor 60 transmits distance signals, and the deformation sensor 50 does not transmit deformation signals. The distance signals are transmitted to the processor 80 via the circuit board 10. The processor 80 transmits control signals to the light module 70 according to the distance signals, and then the first light element 71 emits the notification light according to the control signals. For example, the first light element 71 emits continuous or flashing light beams, such as continuous or flashing blue light. In the embodiment, the first light element 71 can alternately emit light and stop emitting light at a frequency of 0.2 seconds. Accordingly, the user can estimate the distance of the optical communication module A1 traveled in the housing 30 according to the light emitted by the first light element 71. The optical communication module A1 needs to be moved further in the insertion direction D1 by observing the notification light.

In step S30, as shown in FIG. 7, the optical communication module A1 is further moved toward the electrical connector 20 in the insertion direction D1 in the housing 30. At this time, the optical communication module A1 contacts the electrical connector 20, and the terminal portion A11 of the optical communication module A1 is inserted into the slot 21 of the electrical connector 20. However, a gap is between the terminal portion A11 of the optical communication module A1 and the bottom of the slot 21 of the electrical connector 20, and the width of the gap is greater than a predetermined width. When the width of the gap is greater than the predetermined width, it means that the terminal portion A11 of the optical communication module A1 is not well connected to the electrical connector 20. For example, the predetermined width may be 1.5 mm. The width of the gap and the predetermined width are measured in the insertion direction D1.

At this time, the optical communication module A1 deforms the inner elastic sheet 35 of the housing 30, which causes the deformation sensor 50 connected to the inner elastic sheet 35 to deform, and causes the deformation sensor 50 to transmit deformation signals. In the embodiment, when the inner elastic sheet 35 is deformed, the outer elastic sheet 45 can apply an elastic force to the inner elastic sheet 35 to prevent the inner elastic sheet 35 from damage.

In another embodiment, the optical communication module A1 has tolerances, or the specifications of the optical communication module A1 are different from this embodiment. When the inner elastic sheet 35 is deformed, the degree of deformation of the inner elastic sheet 35 may not cause the outer elastic sheet 45 to deform, so the outer elastic sheet 45 may not cause the outer elastic sheet 45 to apply the elastic force on the inner elastic sheet 35.

In the embodiment, the deformation signals can be transmitted to the processor 80 via the circuit board 10. The processor 80 transmits control signals to the light module 70 according to deformation signals, and then the second light element 72 emits the warning light according to the control signals. For example, the second light element 72 emits light beams, such as red light. Moreover, in FIG. 7, the distance between the optical communication module A1 and the distance sensor 60 is within the distance range d1, and the first light element 71 emits the notification light. The warning light (and notification light) emitted by the light module 70 can remind the user that the optical communication module A1 has not been properly inserted into the electrical connector 20. The user should further move the optical communication module A1 in the insertion direction D1.

In another embodiment, the distance range d1 is changed. In the step 30, the distance between the optical communication module A1 and the distance sensor 60 in FIG. 7 is not within the distance range d1. Therefore, the first light element 71 stops emitting the notification light, but the second light element 72 still emits warning light. The user can understand that the optical communication module A1 has not been properly inserted into the electrical connector 20 through the warning light emitted by the light module 70.

In the step S40, as shown in FIG. 8, the optical communication module A1 is further moved toward the electrical connector 20 in the insertion direction D1 in the housing 30. At this time, the terminal portion A11 of the optical communication module A1 is inserted into the slot 21 of the electrical connector 20, and the terminal portion A11 of the optical communication module A1 contacts or is adjacent to the bottom of the slot 21 of the electrical connector 20. In addition, the gap between the terminal portion A11 of the optical communication module A1 and the bottom of the slot 21 of the electrical connector 20 is less than the predetermined width. When the width of the gap is less than the predetermined width, it means that the terminal portion A11 of the optical communication module A1 is well connected to the electrical connector. 20.

In addition, the buckle A12 of the optical communication module A1 is located in the locking hole 351 of the inner elastic sheet 35. At this time, the inner elastic sheet 35, the outer elastic sheet 45, and the deformation sensor 50 elastically rebound, and return to the initial positions. In addition, the deformation sensor 50 stops emitting deformation signals. Since processor 80 does not receive the deformation signals, the light module 70 stopped emitting the warning light.

When the distance sensor 60 measures that the distance between the optical communication module A1 and the distance sensor 60 is less than the predetermined distance d2, the distance sensor 60 emits connection signals. The processor 80 transmits control signals to the light module 70 according to the connection signals, and then the first light element 71 emits the connection light according to the control signals. For example, the first light element 71 emits continuous or flashing light beams, such as continuous or flashing blue light. In the embodiment, the first light element 71 emits continuous blue light. The first light element 71 emits the connection light in a predetermined time, such as two seconds.

Therefore, the user can clearly determine that the optical communication module has been properly inserted into the electrical connector 20 by the connection light and by disabling the second light element 72. In addition, the light module 70 has emitted a warning light in step 30, and stopped emitting the warning light in step 40, which can remind the user that the inner elastic sheet 35 is not damaged. The optical communication module A1 can be well engaged in the housing 30 through the inner elastic sheet 35.

In the step S20 and/or the step S40, the distance sensor 60 detects that the distance between the distance sensor 60 and the optical communication module A1 is within the distance range d1 and/or is less than the predetermined distance d2. If the deformation sensor 50 also emits deformation signals by detecting the deformation of the inner elastic sheet 35, causing the light module 70 to emit the warning light, which indicates that the inner elastic sheet 35 may be damaged and deformed. The optical communication module A1 may be difficult to mount well in the housing 30 by the damaged inner elastic sheet 35.

In conclusion, the optical communication device of the present disclosure uses the deformation sensor to detect whether the inner elastic sheet is deformed, and the distance sensor detects the position of the optical communication module in the housing. The light module is used to emit light signals to remind the user whether the optical communication module is properly inserted into the housing. In addition, the outer elastic sheet is used to prevent the inner elastic sheet from being damaged due to excessive bending.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An optical communication device comprising:

a housing comprising a front opening and an inner elastic sheet adjacent to the front opening;

a positioning structure disposed on the housing, the positioning structure comprising an outer elastic sheet that is adjacent to the inner elastic sheet; and a deformation sensor between the inner elastic sheet and the outer elastic sheet, wherein when an optical communication module is inserted into the housing, the inner elastic sheet is deformed causing the deformation sensor to transmit a deformation signal.

2. The optical communication device as claimed in claim 1, wherein the inner elastic sheet further comprises a locking hole, and the optical communication module further comprises a buckle, wherein the inner elastic sheet elastically rebounds when the buckle is in the locking hole.

3. The optical communication device as claimed in claim 2, further comprising an electrical connector disposed in the housing, wherein the optical communication module is connected to the electrical connector when the buckle is in the locking hole.

4. The optical communication device as claimed in claim 1, wherein the outer elastic sheet elastically resists against the inner elastic sheet, when the optical communication module is inserted into the housing and deforms the inner elastic sheet.

5. The optical communication device as claimed in claim 1, further comprising a light module emitting a warning light in response to the deformation signal.

6. The optical communication device as claimed in claim 1, wherein the positioning structure comprises:

a frame covering the housing adjacent to the front opening; and a plurality of positioning elastic sheets disposed on the frame.

7. The optical communication device as claimed in claim 6, wherein the positioning structure further comprises a combination sheet connected to the frame, the housing further comprises a combination structure, and the combination sheet is inserted into the combination structure of the housing.

8. The optical communication device as claimed in claim 6, wherein the housing further comprises a connection bump, the positioning structure further comprises a connection sheet connected to the frame, and the connection bump extends through the connection sheet.

9. The optical communication device as claimed in claim 1, further comprising a distance sensor disposed in the housing, and configured to measure a distance between the optical communication module and the distance sensor.

10. The optical communication device as claimed in claim 9, further comprising a light module, wherein the distance sensor is further configured to transmit a distance signal according to the measured distance, and the light module emits notification light when the measured distance is within a preset distance range.

11. The optical communication device as claimed in claim 9, further comprising a light module, the distance sensor is further configured to transmit a connection signal according to the measured distance, and the light module emits a connection light according to the connection signal, when the measured distance is within a predetermined distance.

12. An operation method of an optical communication device, the operation method comprising:

step (1) measuring a distance between an optical communication module of the optical communication device and a distance sensor by the distance sensor when the optical communication module is placed into a housing of the optical communication device;

step (2) transmitting a distance signal by the distance sensor when the measured distance is in a preset distance range;

step (3) transmitting a deformation signal by a deformation sensor connected to an inner elastic sheet of the housing when the optical communication module deforms the inner elastic sheet; and step (4) transmitting a connection signal by the distance sensor when the distance measured by the distance sensor is less than a predetermined distance.

13. The operation method of the optical communication device as claimed in claim 12, wherein step (3) further comprises emitting warning light by a light module according to the deformation signal.

14. The operation method of the optical communication device as claimed in claim 13, wherein step (4) further comprises stopping emitting the warning light from the light module when the inner elastic sheet returns to an initial position.

15. The operation method of the optical communication device as claimed in claim 12, wherein step (4) further comprises returning the inner elastic sheet to an initial position when a buckle of the optical communication module is in a locking hole of the inner elastic sheet.

16. The operation method of the optical communication device as claimed in claim 12, wherein step (3) further comprises deforming the inner elastic sheet by inserting the optical communication module inserting-into the housing, thereby causing an outer elastic sheet to resist against the inner elastic sheet, wherein the deformation sensor is between the inner elastic sheet and the outer elastic sheet.

17. The operation method of the optical communication device as claimed in claim 12, wherein step (2) further comprises transmitting a notification light according to the distance signal by a light module.

18. The operation method of the optical communication device as claimed in claim 12, wherein step (4) further comprises emitting a connection light according to the connection signal by a light module.

* * * * *